United States Patent [19]

Hoeman

[11] 3,892,261

[45] July 1, 1975

[54] INSULATING CONDUIT

[75] Inventor: Terry E. Hoeman, Lancaster, Ohio

[73] Assignee: The Babcock & Wilcox Company, New York, N.Y.

[22] Filed: Jan. 26, 1973

[21] Appl. No.: 326,931

[52] U.S. Cl. .............................................. 138/149
[51] Int. Cl. ............................................ F16l 59/08
[58] Field of Search ............................. 138/149, 148

[56] References Cited
UNITED STATES PATENTS

| | | | |
|---|---|---|---|
| 2,142,542 | 1/1939 | Wallach | 138/148 X |
| 2,613,166 | 10/1952 | Gronemeyer | 138/148 X |

Primary Examiner—Jerry W. Myracle
Attorney, Agent, or Firm—J. M. Maguire, Esq.; J. P. Sinnott, Esq.

[57] ABSTRACT

A selectively extendable reflective insulating element is shown and described. A number of almost abutting concentric cylindrical layers of reflective insulation are separated from each other by means of air spaces. The layers of reflective insulation material are connected to axially opposing halves of a relatively light gauge metal casing in order to provide a nested telescoping structure that can "take up" non-uniform lengths of piping as well as to respond to thermally induced changes in insulated pipe length. Splice pieces that cover the mutually near abutting edges of the reflective insulation material tend to prevent heat losses through thermal convection.

2 Claims, 4 Drawing Figures

INSULATING CONDUIT

BACKGROUND OF THE INVENTION

1. Field of the Invention

This invention relates to insulation methods and apparatus and, more particularly, to selectively extendable reflective insulators and the installation of these insulators on lengths of pipe, and the like.

2. Description of the Prior Art

The use of bright, or highly reflective sheets to provide thermal insulation for industrial equipment has been an established practice for a number of years. Ordinarily, aluminum or stainless steel sheets are used for this purpose. The high reflectivities that characterize these materials tend to obstruct the flow of radiant heat in order to provide an efficient, sturdy, light-weight, and long-lasting insulation.

Because the individual sheets in a particular insulating element usually are spaced from each other with intervening air gaps, heat transfer through convective processes is also reduced. Naturally, care must be taken to insure that all of these gaps are isolated from each other to prevent the development of air currents that degrade the convective insulation efficiency of the element.

Translated into the practical conditions of a field installation, this means that the air gaps in an array of spaced sheets which are enclosed within a sheet metal casing usually are isolated from each other through a metal barrier or baffle at the ends of the element in question. For a further improvement in thermal insulation efficiency, it is necessary to insure that a snug fit exists between adjacent elements or casings in order to prevent thermal losses at these casing junctions. This requirement for a snug fit, however, is in conflict with the need to accommodate the forces that are generated in response to thermal expansion and contraction within the insulation casings and the underlying structure.

From the viewpoint of production efficiency it is, of course, preferable to manufacture the insulating elements in uniform sizes.

Pipe insulation provides a good illustration of this point. A length of pipe in an industrial plant, for instance, can be insulated through a covering of several adjacent standard-size reflective insulation elements. In most installations, however, there usually is a remaining exposed pipe segment that is of non-standard length. To completely insulate the pipe, expensive field measurements and special drawings are needed to build the one element that is required to cover this segment of irregular length. Multiplying the extra cost involved in manufacturing this unique element by the number of insulated pipe lengths that obviously are required in a refinery or in a nuclear power plant, for example, provides some appreciation for the undesirability of this hitherto unavoidable situation.

Clearly there is a need for some improvement in reflective insulation technique that will enable a number of adjacent elements to accommodate thermal expansion and contraction without leading to convective heat losses. There is a further need to reduce the costs, delays, and inconveniences that are associated with insulating elements which are specially tailored to match the gaps left by the use of standard elements.

SUMMARY

The invention under consideration provides an acceptable solution to all of these problems. Illustratively, a selectively extendable reflective insulation element that characterizes the invention not only adapts itself to thermally induced dimension changes but also eliminates the need to custom-build these elements to match residual gaps that fail to conform to standard sizes in a way that does not generate convective heat losses.

Typically, a reflective insulation element built according to the principles of the invention has two or more axially slidable protions or halves. One end of each of these halves is in close proximity or in an almost abutting contact relation with the adjacent end of the opposite half. The liners of highly reflective material are, in each half, maintained in spaced relation by means of axially disposed "keys" which separate the individual reflective sheets. The sheets in each half are further protected by means of a set of inner and outer sheet metal casings. These casings are separated from the liners through the axially disposed keys and also abut the corresponding members in the opposite half.

To prevent the development of convective currents between the layers of air that are established by the liners, overlapping sets of "splice pieces" bridge the proximately abutting ends of the liners and the inner and outer casings.

Thus, a typical set of splice pieces has two rigid members that are secured to and essentially sandwich the end of a liner or a casing. The free or unsecured ends of the splice piece members extend well beyond the termination of the sandwiched liner or casing in order to overlap an opposing member on the opposite half of the element in an axially slidable relation.

A "stop" that is secured to the surfaces of the outer casing halves limits the axial travel of the abutting members to prevent these members from colliding or falling apart during shipping, installation or thermally induced movement.

The thermal efficiency of an axially extendable reflective insulation element of the type under consideration has been found, moreover, to equal the efficiency of the standard non-extendable insulating element. Consequently, the invention provides an effective device that can move freely in an axial direction to accommodate irregular equipment sizes and thermally-induced motion. In this way, the invention provides a significant improvement in production economy and in insulation design. It further appears that the use of nearly abutting cases and liners with splice pieces tends to protect the members from damage that might result if these members were axially movable into a snug overlapping engagement. Naturally, in the undesirable case of an overlapping engagement, a less-than-snug fit would tend to promote heat losses through thermal convection at the common overlap.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

For the purpose of illustration, the principles of the invention are described in connection with a reflective insulation element that is to be used to cover a length of pipe. Other underlying structures, e.g. pressure vessels, process machinery, power reactor equipment and the like, also can be protected with insulation that makes use of the novel features that characterize the invention.

Figure 1:
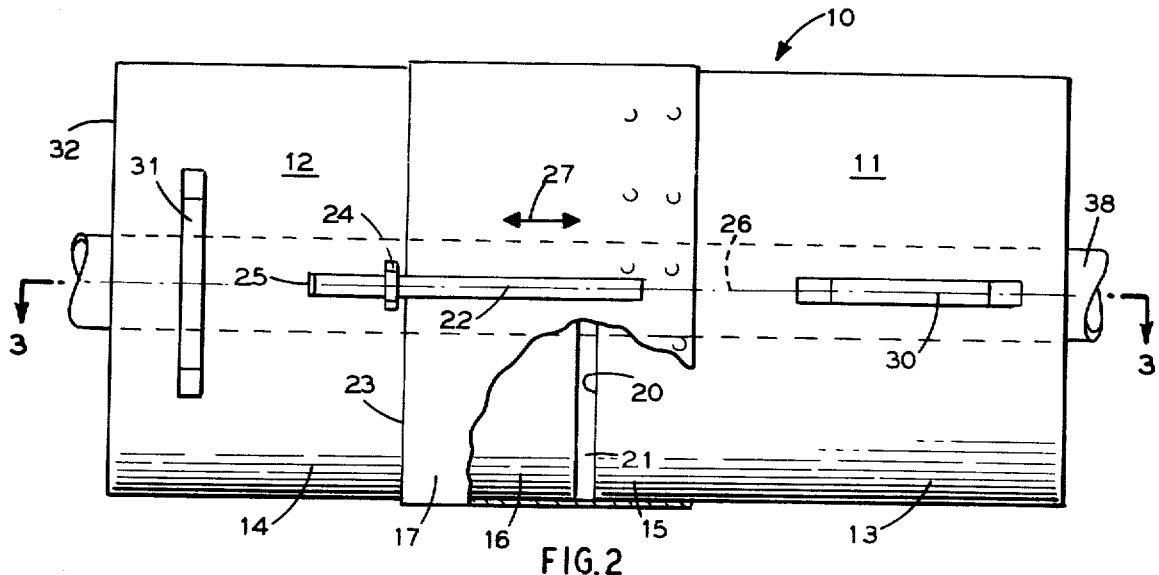
FIG. 1 is a plan view in partial section of a fully telescoped insulation element that embodies features of the invention.

Accordingly, in FIG. 1 a reflective insulation element 10 is approximately divided into almost abutting halves 11 and 12. Each of the halves 11 and 12 is enclosed in a respective outer case 13 and 14. The cases 13 and 14 preferably are formed from sheet metal that is about 0.03 inch thick in order to protect metal foil liners that provide the main reflective insulation (not shown in FIG. 1).

The cases 13 and 14 end in axially aligned and abutting terminal portions 15 and 16, respectively. A splice piece is spot welded to the outer surface of the casing 13 and extends beyond end 20 of the terminal casing portion in order to overlap the adjacent and opposing terminal portion 16 of the outer case 14.

The splice piece 17 bridges a gap 21 between the opposing and nearly abutting terminal portions 15 and 16 of the outer cases 13 and 14. To provide an overlapping combination that is essentially free from convection heat losses, the splice piece is in sliding engagement with the underlying surface of the casing's terminal portion 16.

As shown in the drawing, a strap 22 is spot welded to the outer surface of the splice piece 17 and extends beyond unwelded free end 23 of that splice piece. The strap 22 protrudes through a loop 24 that is spot welded to the outer surface of the case 14. The protruding end of the strap 22 is finished as a stop 25 in order to limit the distance that the two halves 11 and 12 can be moved relative to each other along longitudinal axis 26 in directions indicated with a double-headed arrow 27. This distance is, of course, limited on the other extreme by an engagement between the free end 23 of the movable splice piece 17 and the opposite side of the loop 24, as shown in the drawing.

For ease in transportation and general handling, bails 30 and 31 are welded to the outer surfaces of casings 13 and 14, respectively.

Figure 2:
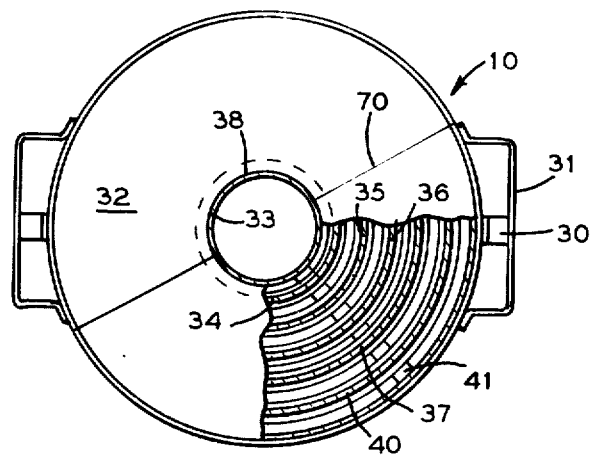
FIG. 2 is a side elevation in partial section of the insulation element shown in FIG. 1.

Turning now to FIG. 2, the element 10 terminates in a disk 32 that is transverse to the longitudinal axis 26. The disk 32 has an aperture 33 that is somewhat larger than the outside diameter of a pipe 38 or conduit that is being insulated. An inner casing 34 is spaced outwardly from the disk aperture 33, thereby to establish an air gap between the innermost longitudinal surface of the casing 34 and the outer surface of the pipe 38.

As shown in broken section in FIG. 2, radially separated layers of high reflectivity metal sheets or liners 35, 36, 37 and 40 are sustained in an equidistantly spaced relation through keys, of which a key 41 is illustrated in the shape of an angle iron. This radial separation establishes several air gaps which further enhance the thermal insulation properties of the element 10 as hereinbefore described.

Figure 3:
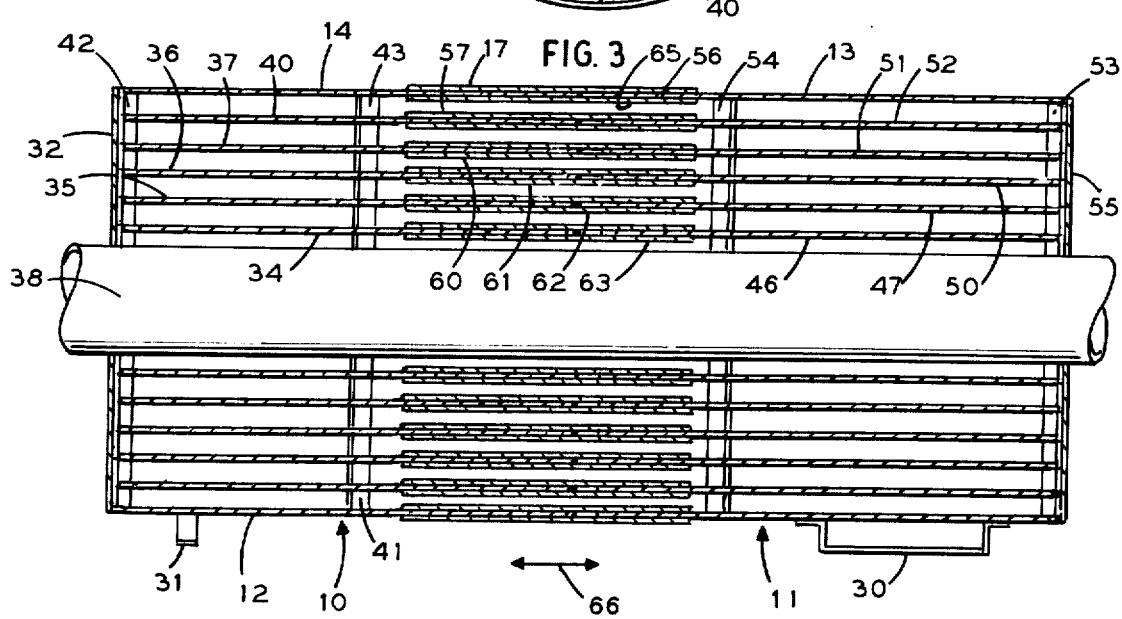
FIG. 3 is a full section of a portion of the insulation element taken along the lines 3—3 of FIG. 1 and viewed in the direction of the arrows.

For a more complete appreciation of the invention, attention is invited to FIG. 3 which shows, in side elevation, the inner casing 34, supporting keys 42, and 43, the liners 35, 36, 37 and 40 and the outer case 14 that comprise the half 12 of the entire insulation element 10. In opposing and almost abutting axial alignment with the half 12 is the half 11. The half 11 has the outer case 13, an inner case 46 and liners 47, 50, 51 and 52 that are radially spaced from each other by means of keys 53 and 54. The extreme ends of the halves 12 and 11 terminate in the disk 32 and a disk 55, respectively.

In accordance with a salient feature of the invention, sets of splice pieces 56, 57, 60, 61, 62 and 63 are spot welded to the inner and outer surfaces of the outer case 13, the liners 52, 51, 50 and 47, and the inner case 46, respectively. As illustrated in FIG. 3, each of the sets of splice pieces include what can be termed the "outer" splice piece 17 and an "inner" splice piece 65 which essentially sandwich the nearly abutting outer cases 13 and 14. Because the set of splice pieces 56 is spot welded only to the casing 13, the casing 14 is free to move in an axial direction as indicated by means of a double headed arrow 66. A similar splice piece set construction is provided for all of the liners and the inner case in order to establish a system of seals or baffles that prevent convection heat losses at the abutting plane between the two halves 11 and 12. The splice piece sets, moreover, further add to the strength and structural integrity of the insulation element 10.

In operation, the insulation element 10 arrives in the field in two longitudinally separate halves. The element 10 is telescoped in order to fit within the remaining exposed gap of the pipe 38 and the longitudinal halves are bound together with steel bands (not shown). After both of the longitudinal halves are seated on the pipe, the bails 30 and 31 are grasped and the element 10 is extended in a longitudinal or axial direction to engage and subsequently to connect the transverse disks 32 and 55 with adjacent disks (not shown) on the adjoining elements of reflective insulation. In this way, much of the effort and expense that is consumed in the custom manufacture of odd-sized elements is avoided. The selectively extendable element 10 also is better able to adjust itself to thermal expansions and contractions without leading to a destructive buckling or producing a thermally inefficient expansion gap between insulating elements.

Figure 4:
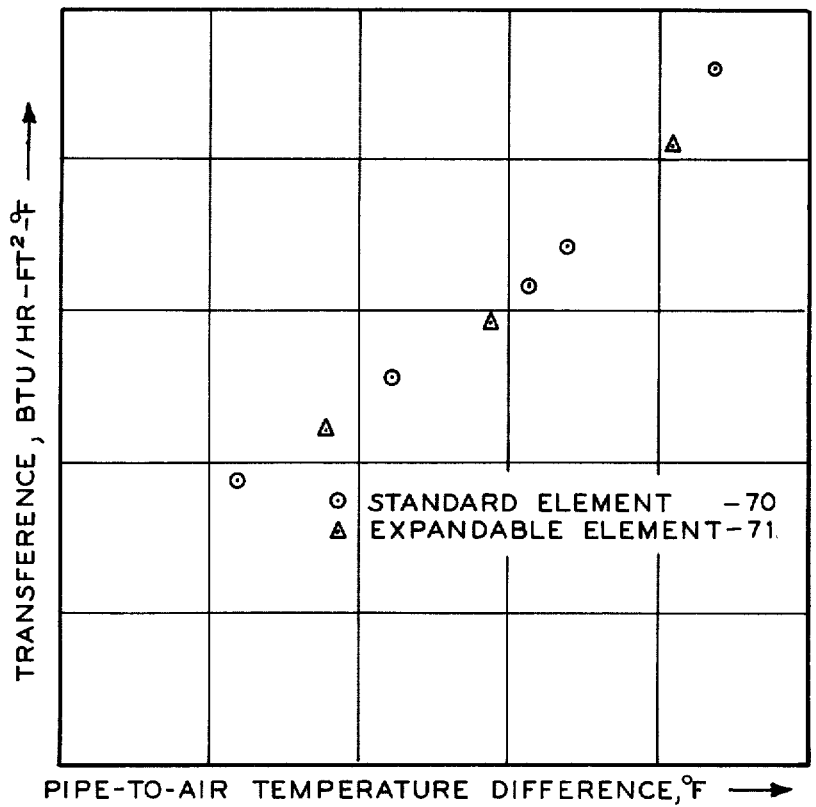
FIG. 4 is a graph that illustrates the thermal efficiency of the invention.

FIG. 4 illustrates the thermal efficiency of the instant invention in terms of thermal transference or overall thermal conductance of a reflective insulation element in British Thermal Units per hour per square foot (BTU/hr-ft$^2$-°F) as a function of pipe-to-air temperature difference in degrees Fahrenheit (°F). Circular data points 70 represent actual results of tests conducted according to American Society for Testing and Materials, Standard Method of Test Designation C691-71 for a standard or non-telescoping sample and triangular data points 71 are the result of a series of the same tests conducted with an element built according to the principles of the invention. Thus, there is provided an apparatus for accomplishing the purposes of the invention that has essentially the same insulation characteristics as a standard reflective insulation element.

As shown in FIG. 2, the element 10 is split longitudinally in a plane 70 in order to permit installation on the pipe 38. Flanges, not shown in the drawing, are formed on the mutually opposing longitudinal edges of the casings and liners. These flanges, moreover, do not lie in the longitudinal plane 70, but form acute angles with this plane. Thus, when the two longitudinal portions of the element 10 are in engagement, the mutually opposing flanges press against one another and form a convection-tight seal, as well as to further enhance the structural rigidity of the entire element 10.

The embodiments of the invention in which an exclusive property or privilege is claimed are defined as follows:

1. An insulating element having at least two relatively movable portions comprising a pair of abutting inner cases, a pair of abutting outer cases spaced from said respective inner cases, a plurality of keys for separating each of said inner cases from said respective outer cases, a plurality of proximately abutting pairs of spaced highly reflective metal sheets said proximately abutting pairs of sheets being supported by said keys and interposed between said inner and outer cases, a plurality of splice piece sets, each of said sets overlapping a respective pair of proximately abutting cases and sheets, said sets being secured to a respective one of said cases and sheets, the other of said proximately abutting cases and sheets in each of said associated pairs being slidably received between said respective splice pieces in order to obstruct convective heat flow therethrough.

2. An insulating element having at least two relatively movable portions comprising a pair of abutting inner cases, a pair of abutting outer cases spaced from said respective inner cases, a plurality of keys for separating each of said inner cases from said respective outer cases, a plurality of proximately abutting pairs of spaced highly reflective metal sheets, said proximately abutting pairs of sheets being supported by said keys and interposed between said inner and outer cases, a plurality of splice piece sets, each of said sets overlapping a respective pair of proximately abutting cases and sheets, said sets being secured to a respective one of said cases and sheets, the other of said proximately abutting cases and sheets in each of said associated pairs being slidably received between said respective splice pieces in order to obstruct convective heat flow therethrough, a strap having one end secured to one of said splice pieces, a stop formed on another end of said strap, and means secured to the other of the movable insulating portions for limiting the relative movement.

* * * * *